United States Patent
Kotaki

[11] Patent Number: 6,115,166
[45] Date of Patent: Sep. 5, 2000

[54] OPTICAL ELEMENT HOLDER

[75] Inventor: Noriaki Kotaki, Gojo, Japan

[73] Assignee: Minolta Co., Ltd., Osaka, Japan

[21] Appl. No.: 09/197,618

[22] Filed: Nov. 23, 1998

[30] Foreign Application Priority Data

Nov. 27, 1997 [JP] Japan .................................. 9-325876

[51] Int. Cl.$^7$ .................................................. G02B 26/08
[52] U.S. Cl. .......................... 359/212; 359/822; 359/872
[58] Field of Search .................................. 359/196, 198,
359/199, 212–214, 221, 223–225, 226,
811, 813, 815, 819, 822, 823, 871, 872;
369/44.15, 44.17, 44.18, 44.22, 244; 248/913,
917, 921, 923

[56] References Cited

U.S. PATENT DOCUMENTS

| 5,138,496 | 8/1992 | Pong | 359/822 |
| 5,878,017 | 3/1999 | Ikegame | 359/822 |

FOREIGN PATENT DOCUMENTS

6-17156 of 1994 Japan .
8-95013 of 1996 Japan .

*Primary Examiner*—James Phan
*Attorney, Agent, or Firm*—Morrison & Foerster LLP

[57] ABSTRACT

An optical element holder having a simple structure and which is capable of being adjusted in six axes is disclosed. A movable plate is disposed among two pairs of side walls of a base, and a rotary plate for holding an optical element is integrally and rotatably held in the movable plate. The movable plate is adjusted by adjusting springs attached to one pair of side walls of the two pairs of side walls, and by adjusting screws attached to the other pair of side walls of the two pairs of side walls. The movable plate is moved along the base for adjustment with respect to the X and Y directions. The rotary plate is pushed by a coiled spring, which is rotated for adjustment with respect to the θ direction by an adjustment screw attached to the rotary plate. The movable plate and the rotary plate are integrally pushed toward the base by a plate spring, and by four adjustment screws attached to the rotary plate. The height in the contacting and separating direction Z of the movable and rotary plates with respect to the base, and tilts θ1 and θ2 about the X and Y axes, are also adjusted by the plate spring and the four adjustment screws attached to the rotary plate.

17 Claims, 9 Drawing Sheets

OPTICAL ELEMENT HOLDER

This application is based on Patent Application No. 9-325876 filed in Japan, the content of which is hereby incorporated by reference.

FIELD OF THE INVENTION

The invention generally relates to an optical element holder, and more specifically, to an optical element holder capable of being adjusted in six axes.

BACKGROUND OF THE INVENTION

Figure 1:
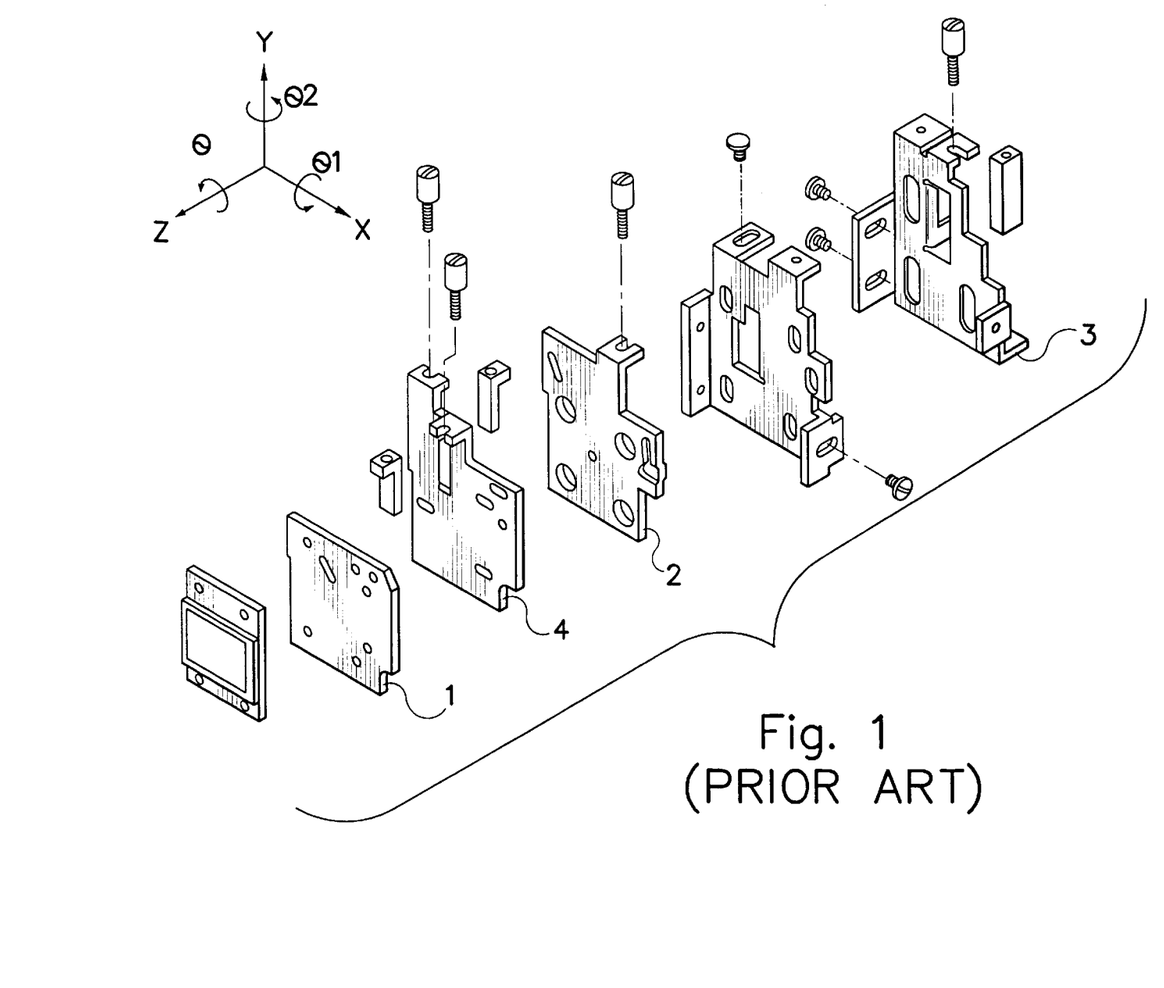
FIG. 1 is an exploded perspective view of a conventional optical element holder.

Conventionally, various types of holders capable of being adjusted in six axes have been proposed for optical elements such as charge coupled devices (CCDs) and liquid crystal devices (LCDs). For example, a holder shown in FIG. 1 comprising stages 1, 2, 3 and 4 may be adjusted in directions X, Y, Z and $\theta$, respectively, wherein the stages are assembled so that they are superposed one on top of another. As to directions $\theta 1$ and $\theta 2$, adjustment is made by fixing the holder while tilting it in directions $\theta 1$ and $\theta 2$ (see, for example, Japanese Laid-open Patent Application No. H8-95013).

Figure 2:
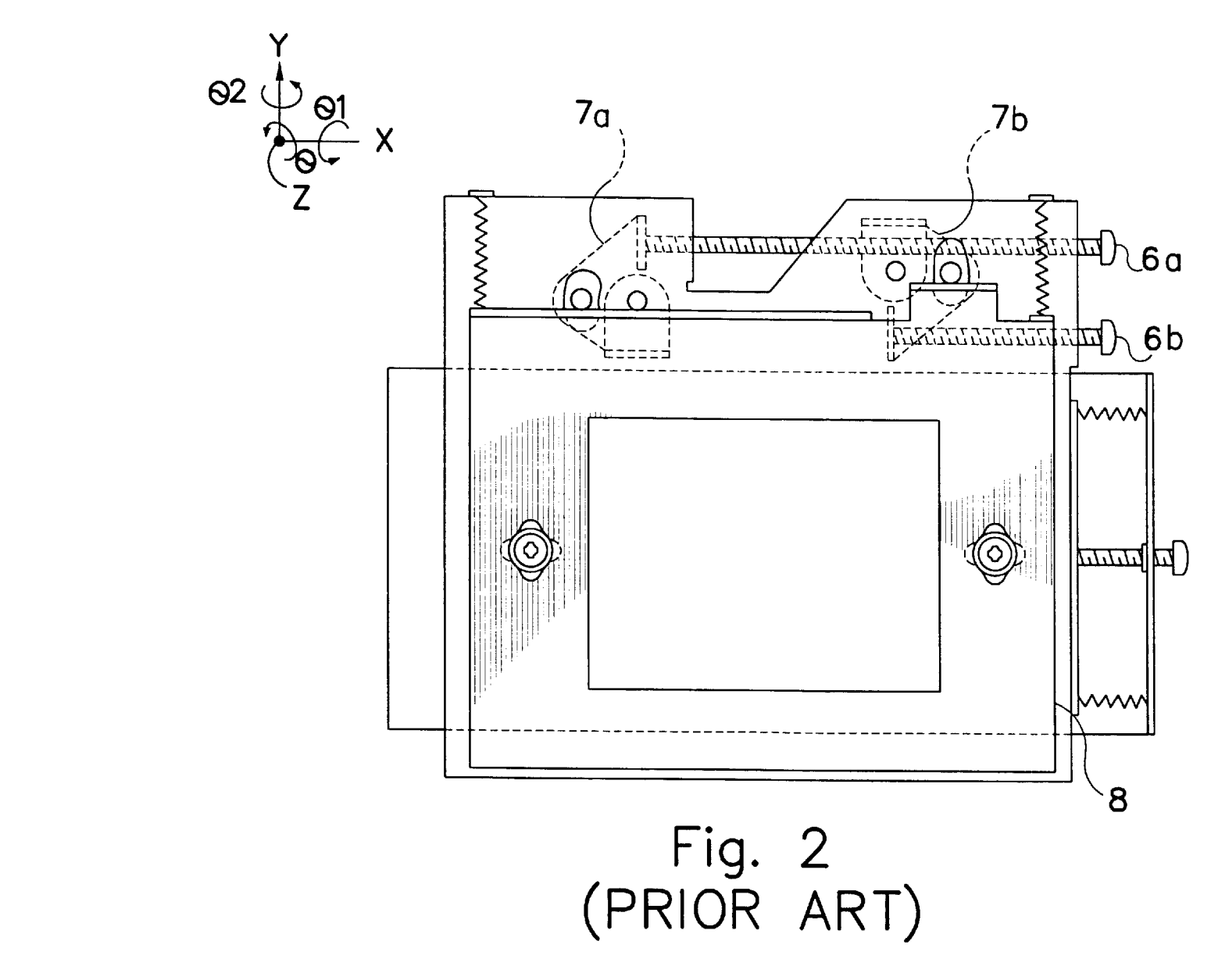
FIG. 2 is a plan view of another conventional optical element holder.

In a holder shown in FIG. 2, a stage 8 is made movable in directions X and $\theta$ through levers 7a and 7b by forward and backward movements of two adjustment screws 6a and 6b, thereby reducing the number of stages. However, since the center of rotation for the $\theta$-direction adjustment disaccords with the center of the optical element, it is necessary to perform re-adjustment in the X and Y directions after the $\theta$-direction adjustment is performed (see, for example, Japanese Published Utility Model Application No. H6-17156).

In any case, the conventional optical element holders capable of being adjusted in six axes generally have complicated structures and a large number of parts.

SUMMARY OF THE INVENTION

Accordingly, a feature of the invention is to provide an optical element holder as simple in structure as possible and which is capable of being adjusted in six axes. To overcome the above-mentioned technical drawbacks, the invention provides an optical element holder having a simple structure that can be adjusted in six axes. The optical element holder of the invention comprises a base, a movable plate and a rotary plate. The movable plate is disposed on the base. The movable plate is held by the base so as to be movable along the base in directions of axes X and Y, and to be movable from the base in a contacting and separating direction Z while being tilted in directions $\theta 1$ and $\theta 2$ about the axes X and Y. The rotary plate is integrally held in the movable plate so as to be rotatable in a direction $\theta$ about an axis of rotation extending in the contacting and separating direction Z. An optical element is attached to the rotary plate.

In the above-described structure, when the rotary plate is rotated in the direction $\theta$ about the axis of rotation with respect to the movable plate, the optical element is rotated in the direction $\theta$ about the axis of rotation with respect to the base. The rotary plate to which the optical element is attached and movable plate integrally move except they rotate relatively to each other. When the movable plate and rotary plate are moved in the X and Y directions with respect to the base, the optical element is also moved in the X and Y directions with respect to the base. When the movable plate and rotary plate are moved in the Z direction so as to be separated from or brought into contact with the base, the optical element is also moved in the Z direction with respect to the base. When the movable plate and the rotary plate are tilted in the directions $\theta 1$ and $\theta 2$ about the axes X and Y with respect to the base, the optical element is also tilted in the directions $\theta 1$ and $\theta 2$ about the axes X and Y. That is, the optical element can be adjusted with respect to the six axes X, Y, Z, $\theta$, $\theta 1$ and $\theta 2$. The holder of the above-described structure mainly includes the base, movable plate and rotary plate. This holder has a small number of parts as compared to the conventional holders. Thus, this holder allows the optical element to be adjusted in six axes with a simple structure.

In the above-described structure, by attaching the optical element such that the center of the optical element coincides with the center of rotation of the rotary plate with respect to the movable plate, adjustment is easily made because the center of the optical element does not shift from the center of rotation even when the optical element is rotated in the $\theta$ direction after the central position of the optical element is adjusted with respect to the X and Y directions. By forming a through hole in the base so as to oppose the optical element attached to the rotary plate, even when an optical system is disposed on the base side of the holder, the optical path between the optical system and the optical element is not interrupted by the base. When an optical element is provided in an optical system disposed on the rotary plate side of the holder, for example, the wiring of the optical element can be passed through the throughhole.

The above features and advantages of the invention will be better understood from the following detailed description taken into conjunction with the accompanying drawings.

DETAILED DESCRIPTION OF THE INVENTION

An optical element holder 10 according to an embodiment of the invention as shown in FIGS. 3 to 10 will now be described in detail. Holder 10 mainly includes, as shown in the perspective views of FIGS. 3 to 7 and the plan view of FIG. 8, a base 20, a movable plate 30 disposed on base 20, a rotary plate 40 disposed in movable plate 30, and pushing plates 76.

Figure 4:
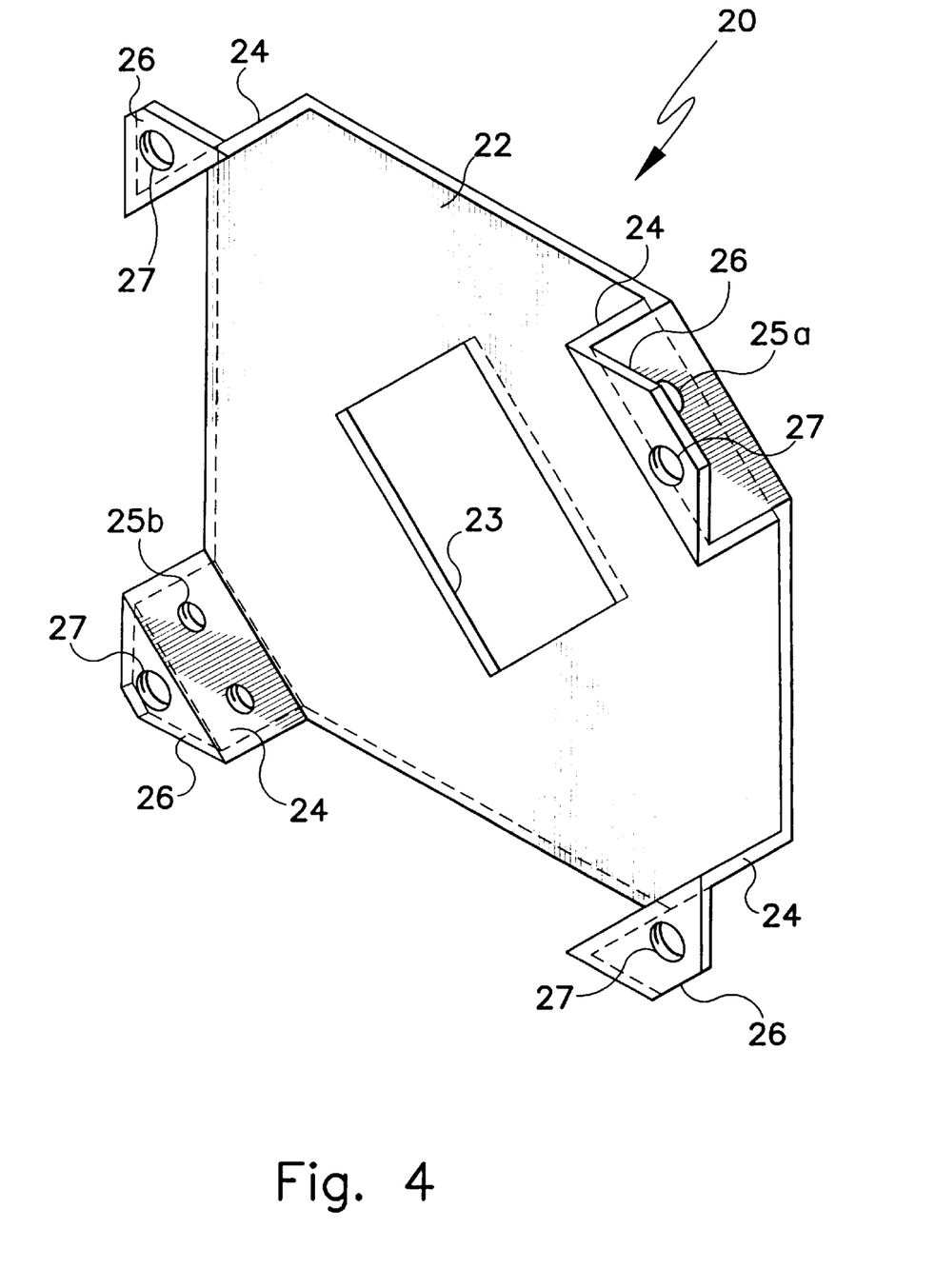
FIG. 4 is a perspective view of a base of the holder of FIG. 3.

Base 20 is, as shown in FIG. 4, a rectangular plate with its four corners bent stepwise, and has a substantially rectangular bottom wall 22, two pairs of opposing side walls 24 provided at the corners of bottom wall 22, and upper walls 26 extending outward from the tops of side walls 24. In the center of bottom wall 22, a through hole 23 is formed. Although detailed description will be given later, in one of each pair of side walls 24, a screw hole 25a for an adjustment screw 50 or 60 (see FIG. 8) is formed, and in the other thereof, two screw holes 25b are formed for fixing a plate spring 52 or 62 (see FIG. 8). In each of upper walls 26, a screw hole 27 is provided for fixing a pushing plate 76.

Figure 3:
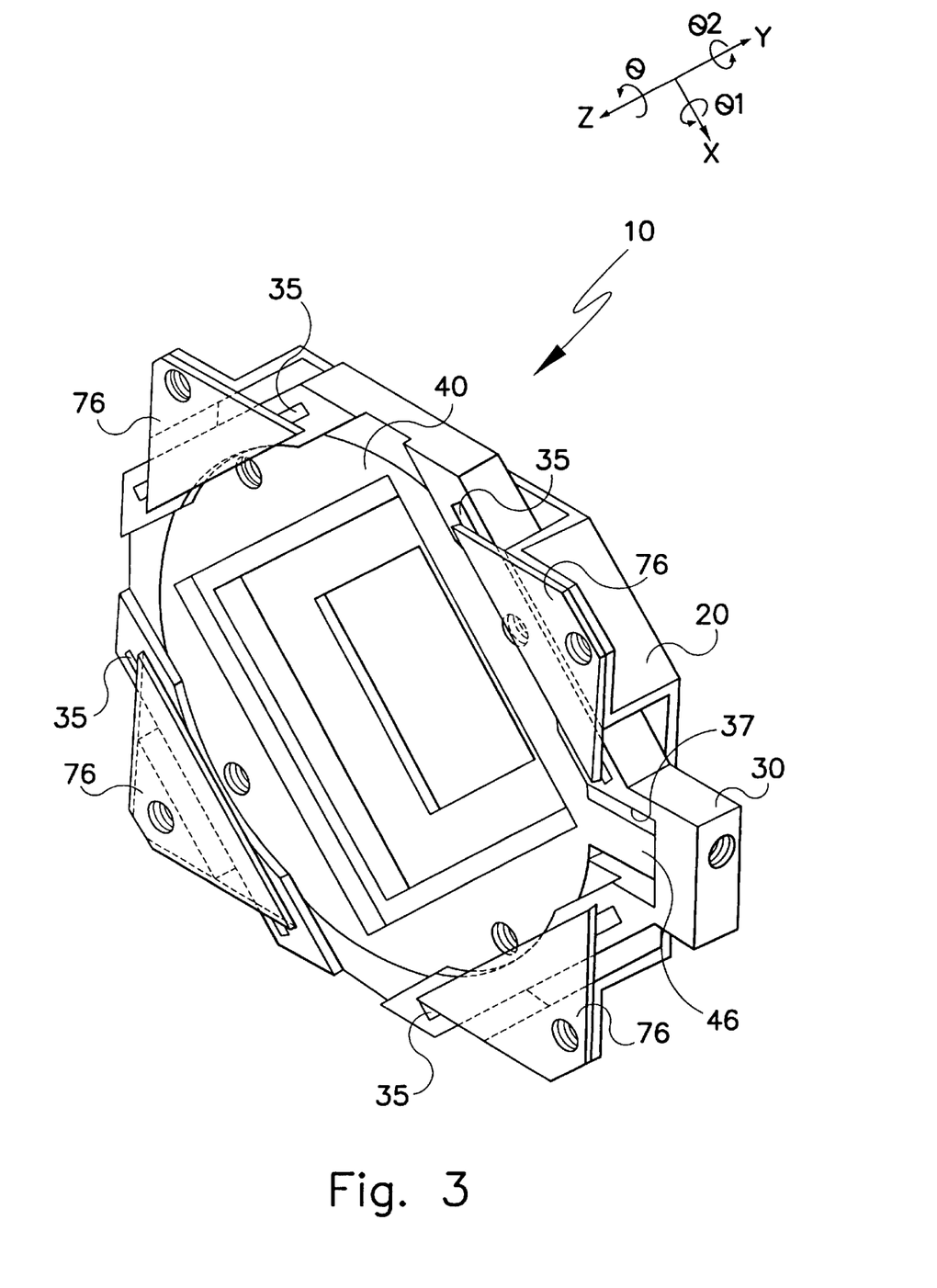
FIG. 3 is an assembly perspective view of an optical element holder according to an embodiment of the invention.
Figure 5:
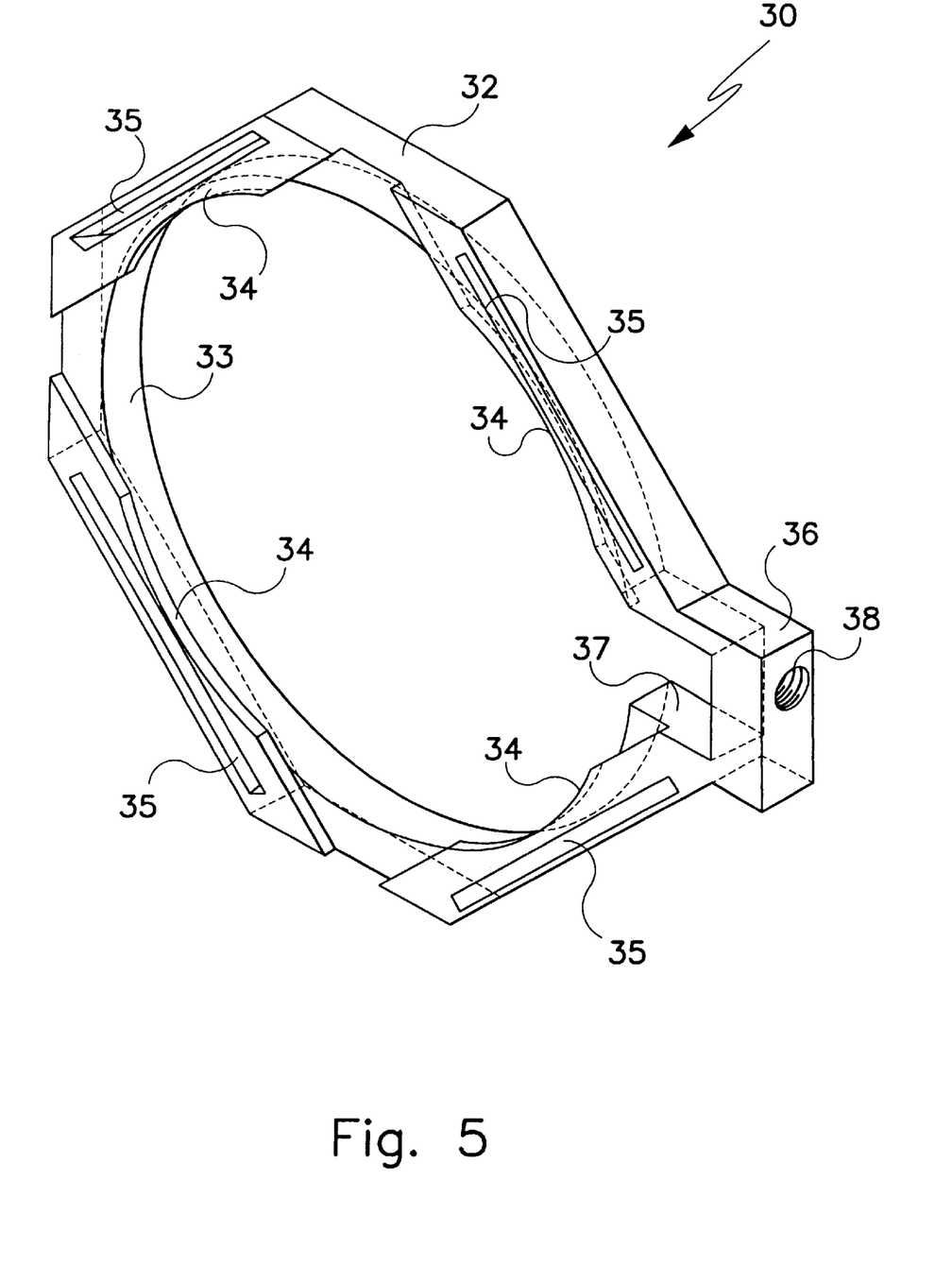
FIG. 5 is a perspective view of a movable plate of the holder of FIG. 3.
Figure 8:
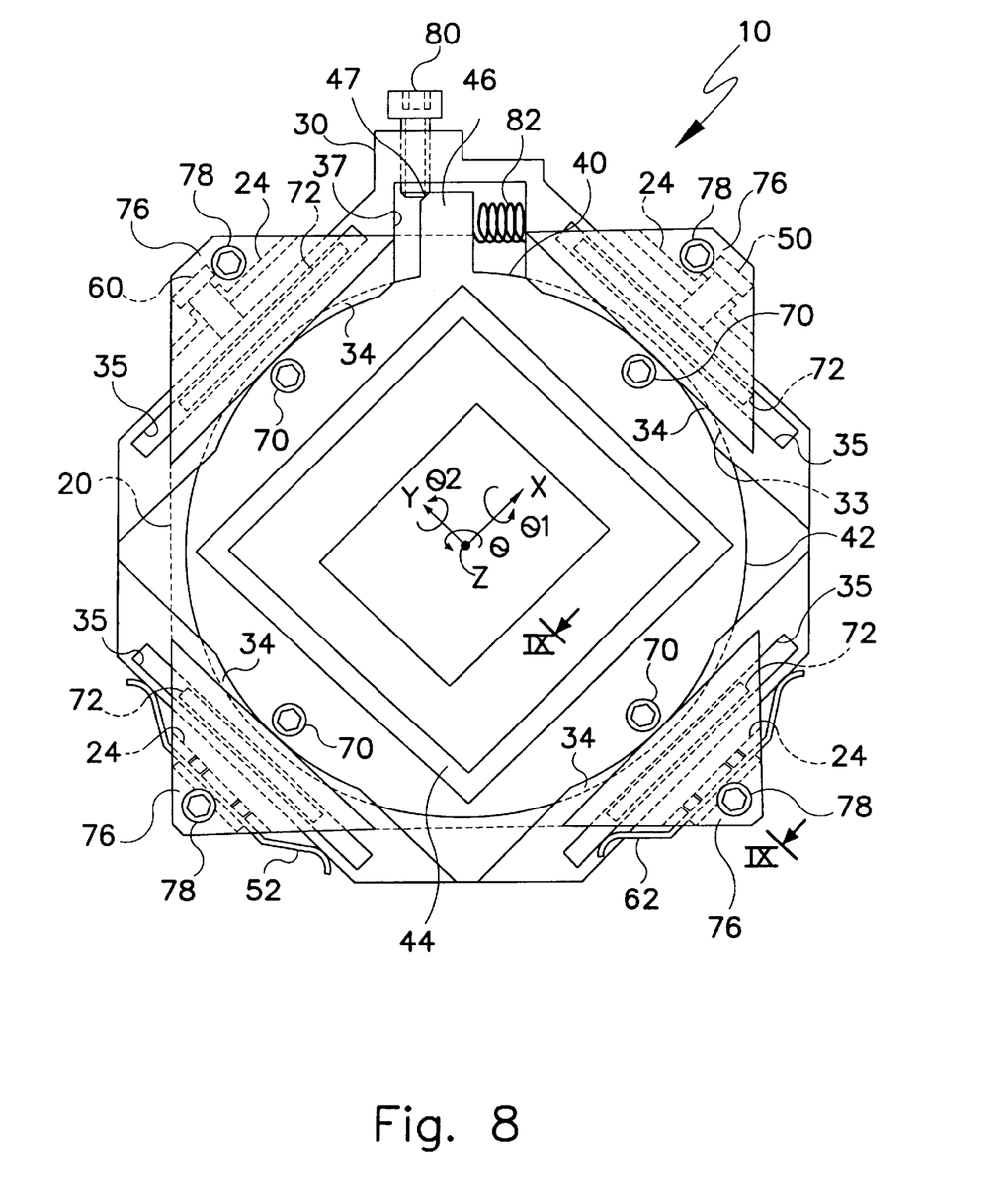
FIG. 8 is an assembly plan view of the holder of FIG. 3.

Movable plate 30 includes, as shown in FIG. 5, a substantially octagonal body 32 and a protrusion 36 protruding from one side of body 32. As shown in FIGS. 3 and 8, body 32 is disposed on the bottom wall 22 of base 20, and side walls of body 32 oppose side walls 24 of base 20 so as to be substantially parallel to each other. In body 32, a substantially circular guide hole 33 is formed. Inside protrusion 36, a groove hole 37 is formed which is continuous with guide hole 33 outwardly in the direction of the diameter. In the peripheral wall of protrusion 36, a screw hole 38 is formed which extends through the wall in the direction of the diameter to reach screw hole 37. On the upper surface of body 32, engagement strips 34 are provided which overhang guide hole 33 inwardly in the direction of the diameter. In the upper surface of body 32, bottomed grooves 35 are provided for holding plate springs 72.

Figure 6:
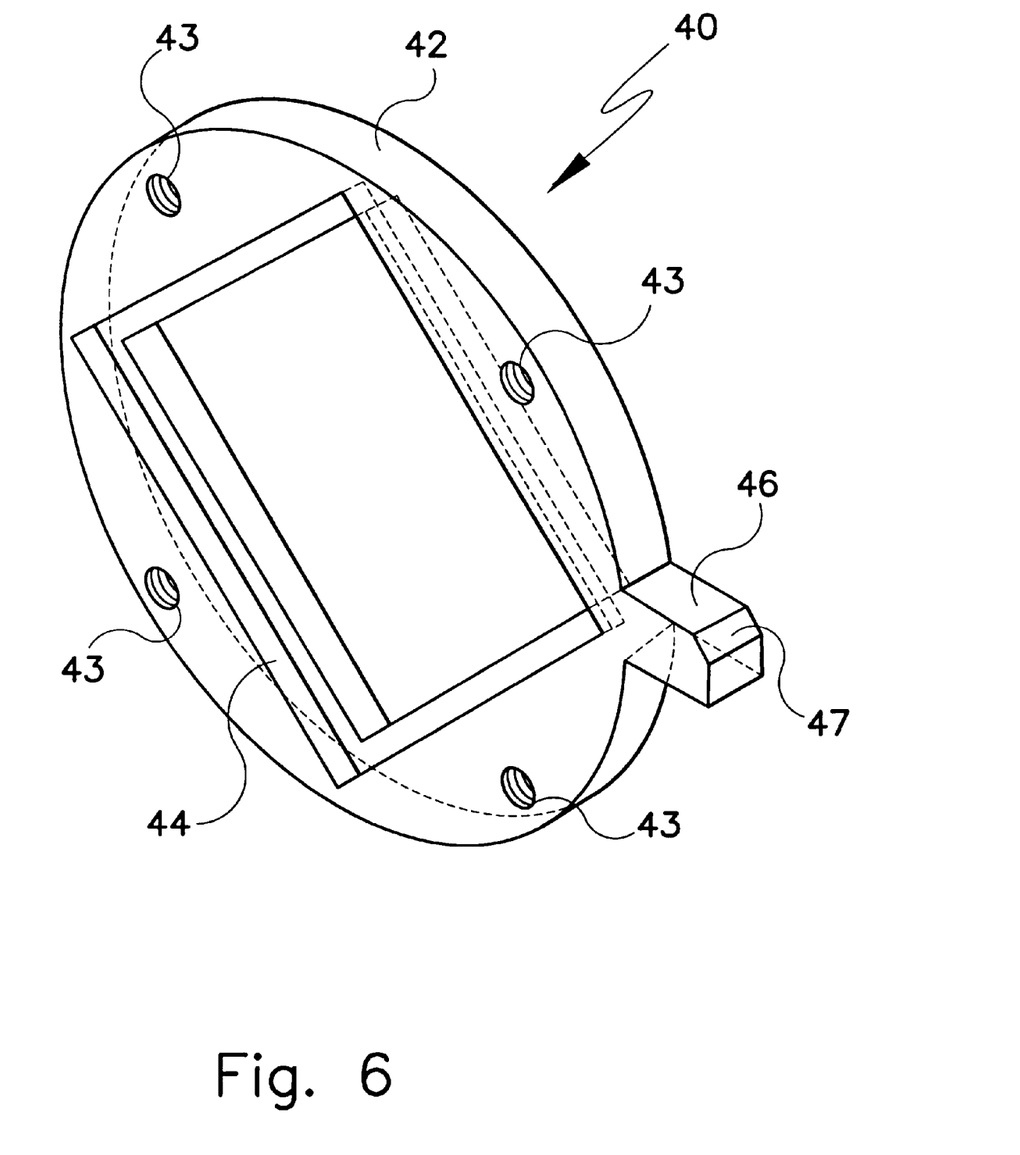
FIG. 6 is a perspective view of a rotary plate of the holder of FIG. 3.

Rotary plate 40 has, as shown in FIG. 6, a substantially circular body 42 and a protrusion 46 protruding from body 42 in the direction of the diameter. As shown in FIGS. 3 and 8, body 42 slides in guide hole 33 of movable plate 30, and protrusion 46 slidingly engages with groove hole 37 of movable plate 30. In body 42, an optical element attachment hole 44 is formed for attaching an optical element such as a DMD (digital mirror device) or a liquid crystal panel. Optical element attachment hole 44 is formed in two steps so as to have a convex cross section. In the peripheral portion of body 42, four screw holes 43 are formed which pass through body 42 in the direction of the width. Protrusion 46 has its one corner chamfered to form a chamfered portion 47.

Figure 7:
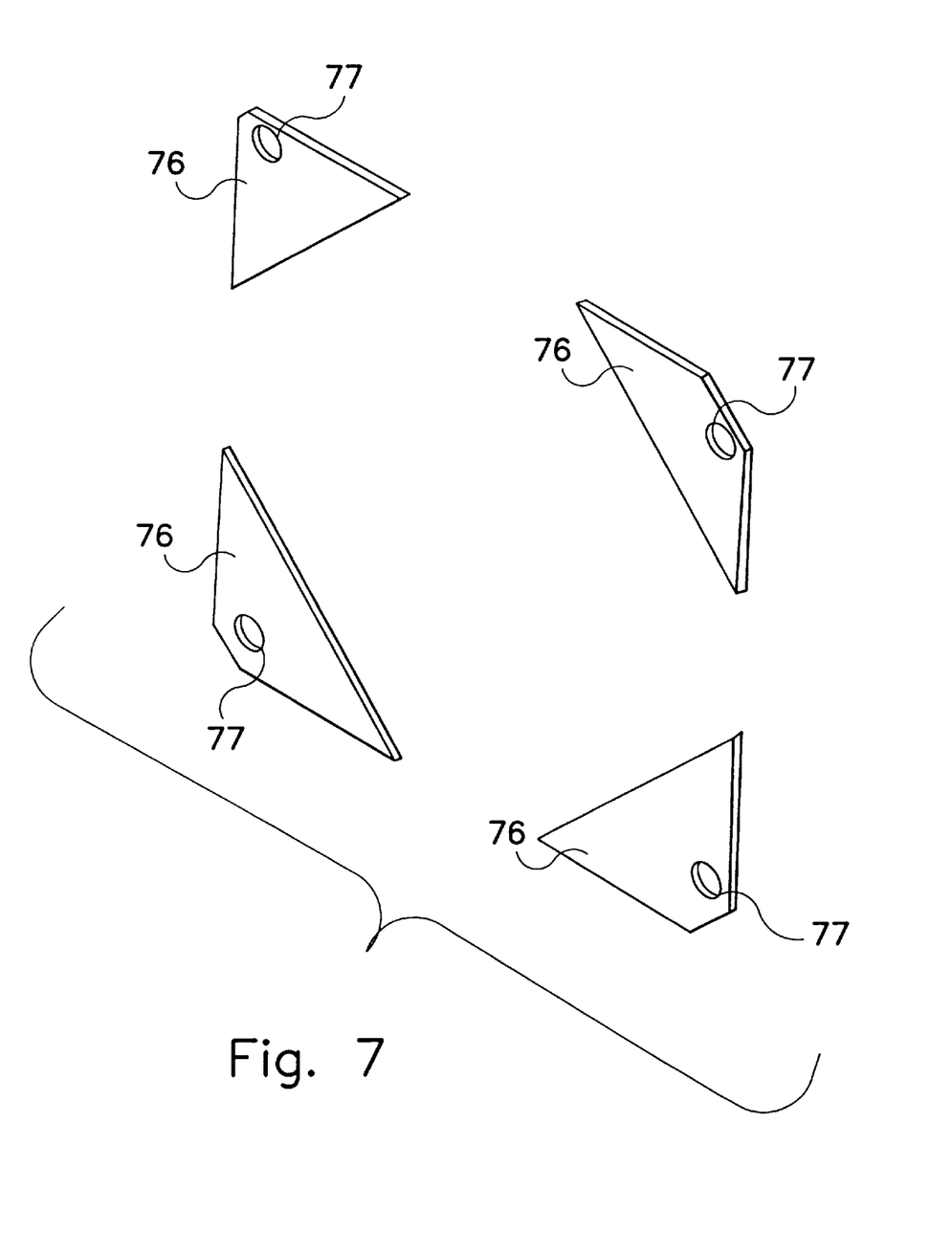
FIG. 7 is a perspective view of a pushing plate of the holder of FIG. 3.

Turning to FIG. 7, pushing plates 76 are substantially triangular in shape with each plate having a through hole 77.

Holder 10 is assembled as shown in FIG. 8. That is, in screw hole 25a of one of each pair of side walls 24 of base 20, adjustment screw 50 or 60 is inserted, and the tips of adjustment screws 50 and 60 abut the side walls of movable plate 30. In the other of each pair of side walls 24 of base 20, plate spring 52 or 62 is fixed by use of screw holes 25b. Plate springs 52 and 62 abut the side surfaces of movable plate 30 to push movable plate 30 toward the other side walls 24, that is, toward adjustment screws 50 and 60. Consequently, by rotating adjustment screws 50 and 60 so as to move forward or backward in the axial direction, the optical element can be moved in X and Y directions along base 20.

In groove hole 37 of movable plate 30, a coiled spring 82 is disposed on the side opposite to chamfered portion 47 of protrusion 46 of rotary plate 40 so as to push rotary plate 40 toward chamfered portion 47 against movable plate 30. In screw hole 38 of protrusion 36 of movable plate 30, an adjustment screw 80 is inserted so that the tip of adjustment screw 80 abuts chamfered portion 47 of protrusion 46 of rotary plate 40 to rotate rotary plate 40 along guide hole 33 of movable plate 30 against the pushing force of coiled spring 82. That is, adjustment in the η-direction of the optical element can be made by adjustment screw 80.

Figure 9:
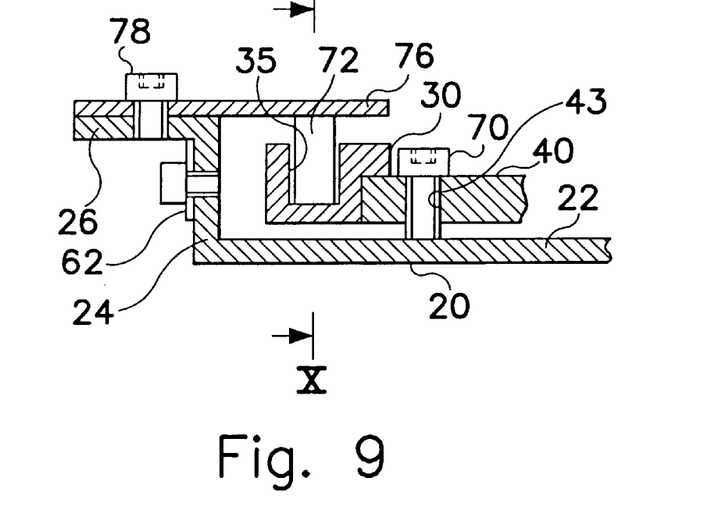
FIG. 9 is an enlarged cross-sectional view taken substantially along the line IX—IX of a relevant portion of the holder of FIG. 8.
Figure 10:
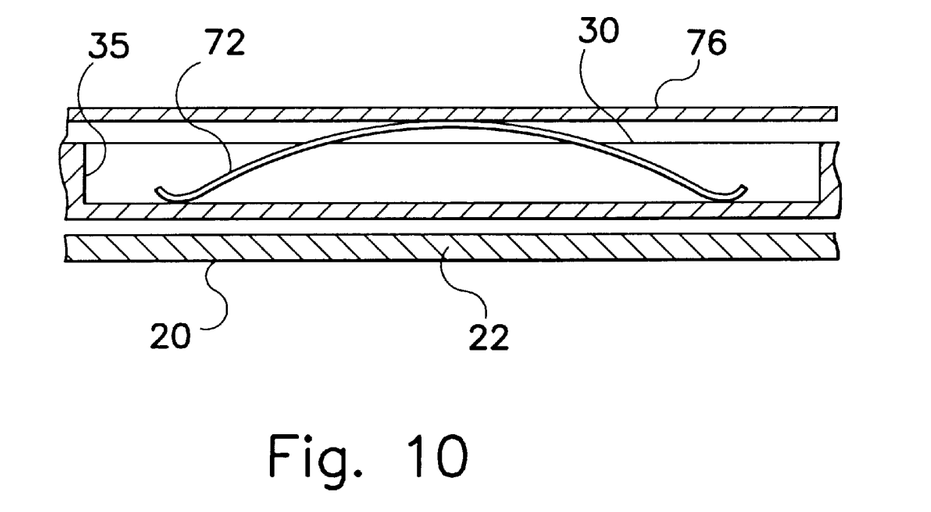
FIG. 10 is an enlarged cross-sectional view taken substantially along the line X—X of a relevant portion of the portion of the holder of FIG. 9.

In each of bottomed grooves 35 of movable plate 30, as shown in the cross-sectional views of FIGS. 9 and 10, a substantially W-shaped plate spring 72 is inserted. Plate spring 72 is pushed by pushing plate 76 fixed to upper wall 26 of base 20 by a screw 78 so as to push movable plate 30 toward bottom wall 22 of base 20. Since engagement strips 34 of body 32 of movable plate 30 abut the upper surface of body 42 of rotary plate 40, rotary plate 40 is pushed toward bottom wall 22 of base 20. In each of screw holes 43 of body 42 of rotary plate 40, as shown in FIG. 9, an adjustment screw 70 is inserted from the upper surface so that the end surface thereof abuts bottom wall 22 of base 20. Consequently, by rotating four adjustment screws 70 so as to move forward or backward in the axial direction, rotary plate 40 can be moved in the contacting and separating direction Z with respect to base 20. Moreover, by varying the protrusion amounts of adjustment screws 70 provided in four positions, movable plate 30 can be tilted about the X and Y axes with respect to base 20, that is, in the directions θ1 and θ2.

As described above, the position of the optical element in holder 10 is adjustable in the six axes X, Y, Z, θ, θ1 and θ2 by rotating adjustment screws 50, 60, 70 and 80. Holder 10 mainly includes the base 20, movable plate 30 and rotary plate 40, which is simple in structure and can be more easily reduced in size than conventional holders.

The invention is not limited to the above-described embodiment but may be otherwise variously embodied.

I claim:

1. An optical element holder comprising:
   a base;
   a movable plate disposed on said base, said movable plate being held by said base so as to be movable along said base in directions of two axes X and Y in a plane lying in said movable plate, and to be movable from said base in a contacting and separating direction Z intersecting the plane of said movable plate, while being tilted in directions θ1 and θ2 about said two axes X and Y; and
   a rotary-plate to which an optical element is attached, said rotary plate being integrally held in said movable plate so as to be rotatable in a direction θ about an axis of rotation extending in said contacting and separating direction Z.

2. An optical element holder of claim 1, further comprising:
   a pushing member; and
   a stopping member for receiving a pushing force,
   wherein said pushing member and said stopping member are provided for adjusting said directions.

3. An optical element holder of claim 1, further comprising screws for adjusting said moveable plate and rotary plate in said directions.

4. An optical element holder of claim 1, wherein said base is a rectangular plate with four corners bent stepwise so as to form two pairs of opposing side walls.

5. An optical element holder of claim 4, wherein said base further comprises upper walls extending outward from the tops of said side walls.

6. An optical element holder of claim 4, wherein said base further comprises screw holes in a first pair of said two pairs of opposing side walls.

7. An optical element holder of claim 6, wherein said movable plate is substantially orthogonal and includes side walls that oppose said rectangular plate side walls so as to be substantially parallel to each other.

8. An optical element holder of claim 7, wherein a circular guide hole is formed inside the body of said movable plate.

9. An optical element holder of claim 8, wherein said rotary plate is substantially circular and slides in said circular guide hole.

10. An optical element holder of claim 9, wherein an optical element attachment hole is formed inside the body of said rotary plate.

11. An optical element holder of claim 10, further comprising an optical element.

12. An optical element holder of claim 11, wherein said optical element is attached in said attachment hole of said rotary plate.

13. An optical element holder of claim 12, further comprising adjustment screws which are inserted in said screw holes of said first pair of the two pairs of the base opposing side walls.

14. An optical element holder of claim 13, further comprising plate springs which are fixed to a second pair of the two pairs of the base opposing side walls.

15. An optical element holder of claim 14, wherein said adjustment screws adjust said moveable plate and rotary plate in said directions.

16. An optical element holder of claim 11, wherein said optical element is a digital mirror device (DMD).

17. An optical element holder of claim 11, wherein said optical element is a liquid crystal panel.

* * * * *